United States Patent [19]
Davis et al.

[11] Patent Number: 5,606,446
[45] Date of Patent: Feb. 25, 1997

[54] OPTICAL TELECOMMUNICATIONS SYSTEM EMPLOYING MULTIPLE PHASE-COMPENSATED OPTICAL SIGNALS

[75] Inventors: Charles M. Davis; Marvin W. Ward, both of Centreville; Clarence J. Zarobila, Leesburg, all of Va.

[73] Assignee: Optimux Systems Corporation, Centreville, Va.

[21] Appl. No.: 542,013

[22] Filed: Oct. 12, 1995

Related U.S. Application Data

[63] Continuation-in-part of Ser. No. 207,121, Mar. 8, 1994, Pat. No. 5,459,600.
[51] Int. Cl.$^6$ .................................................. H04B 10/12
[52] U.S. Cl. .................... 359/173; 359/115; 359/127; 359/122; 385/124; 385/14; 356/345
[58] Field of Search ..................... 359/127, 122, 359/133, 157, 164, 173, 183, 188, 195, 161, 156; 356/345; 385/3, 12, 14, 24, 31; 250/227.19, 227.27

[56] References Cited

U.S. PATENT DOCUMENTS

| | | | |
|---|---|---|---|
| 4,860,279 | 8/1989 | Falk et al. | 359/115 |
| 4,882,775 | 11/1989 | Coleman | 359/115 |
| 5,063,559 | 11/1991 | Marcuse | 359/127 |
| 5,459,600 | 10/1995 | Davis et al. | 359/173 |

*Primary Examiner*—Wellington Chin
*Assistant Examiner*—Kinfe-Michael Negash
*Attorney, Agent, or Firm*—Lowe, Price, LeBlanc & Becker

[57] ABSTRACT

Optical telecommunication systems using phase-compensation interferometry wherein receiver units have N interferometer configurations each with a unique path length difference that is identical to a path length difference in one of N interferometer configurations at the corresponding transmitter units. The transmitter and receiver units separately and individually use N+1 arms, one of which serves as a reference common to the other N arms that along with the common reference arm form the N interferometer configurations of the transmitter and receiver units. N phase modulators, one in each of the N paths of the transmission units, are used to apply a separate and individual telecommunication signal (payload) to the portion of the light in that path. These N separate payloads may be of the same or different protocols. These N separate payloads may have the same or different bit rate/second. These N separate payloads may be digital or analog. These N payloads may be individually and separately dropped out or inserted at a drop/insert site. These N separate payloads may be used to increase the capacity of a transmission path by a factor of up to N. These N separate payloads may be used to employ lower bit rate/second electrons to produce a higher bit rate/second payload where the increased in bit rate/second is a factor of up to N.

50 Claims, 12 Drawing Sheets

OPTICAL TELECOMMUNICATIONS SYSTEM EMPLOYING MULTIPLE PHASE-COMPENSATED OPTICAL SIGNALS

CROSS-REFERENCE TO RELATED APPLICATIONS

This is a continuation-in-part of the U.S. patent application Ser. No. 08/207,121 filed on Mar. 8, 1994 now U.S. Pat. No. 5,459,600.

BACKGROUND OF THE INVENTION

This invention relates to an optical telecommunications system. More specifically, this invention relates to an optical telecommunications system which uses multiple phase-compensated optical signals.

At present, digital and analog transmission employ a variety of systems for telecommunications including point-to-point microwave radio, optical fiber cable link, copper cable link, and communication satellite transmission. Such systems are used for transmitting telephone calls, television signals, and other audio and/or visual signals as well as various data telecommunications. In recent years, the trend has been towards the use of increasing numbers of optical fiber links. Such systems generally use optical fiber in a passive role for transmitting data and communications point-to-point using conventional electronics for all applications and multiplexing requirements. That is, the optical fiber cable between the transmitter and receiver is essentially a dumb link. The trend in recent years has been towards higher and higher data transmission rates reaching into the Gb/s range. This requires the use of more costly electronic components and optical sources. Much of the early single-mode fiber that has been deployed is unable to accommodate these high transmission rates. Furthermore, a variety of protocols are presently in use. These include DS3, SONET, International (E3), ATM, etc. When several of these are to be transmitted simultaneously over a common bus, it is necessary to digitally convert them to a single protocol.

In present systems, information is usually multiplexed in time-division format. The diverse signals are multiplexed together by combining them temporally. For example, 24 digital signal zero (DS0) level signals are sampled sequentially and combined to form the next level of signal transmission, which is T1 (DS1). The outputs of 4 T1 transmitters may be sampled and stacked sequentially in time by a T2 (DS2) multiplexer. Similarly, the outputs of 28 T1 or 7 T2 transmitters may be sequentially sampled and combined by a T3 (DS3) multiplexer. This process of combining or multiplexing lower level telemetry signals is repeated many times until signals in the GB/s range are produced.

The above approach has a number of disadvantages. European protocol differs from U.S. protocol. Thirty-two DS0 signals are combined by an E1 multiplexer, the European counterpart of T1. Thirty E1 channels transmit DS0 signals while the other two channels are used for signaling and alarm/supervision purposes. In general, European and U.S. standard telemetry is not mixed. The byte rates and formats differ. Likewise, while DS3 and synchronous optical network (SONET) formats may be combined in the same transmission facility, the DS3 is limited to non-add/drop [insert] applications. In other words, such arrangements make it difficult to drop out signals and insert other signals at intermediate ends of the transmission path. In such cases, at a point further down the facility, a portion of the signals are separated and diverted from the cable, while the remainder plus some additional information inserted at the same location continues to propagate along the cable. However, at such points, the multiplexed signal must be electronically broken down into basic DS3, DS2, DS1, DS0, ATM wideband, and fractional wide band data operating at DS3 and SONET rate, sorted, and recombined. This requires significant quantities of electronics including both a digital demultiplexer, one or more multiplexers and microprocessors as illustrated in the prior art FIG. 1.

Another disadvantage of the above approach is that narrow bandwidth single mode lasers are used as the optical source. Such narrow band sources are especially susceptible to back reflected light due to Brillioun scattering and/or other nonlinear optical effects. Backscattering places an upper limit on the intensity of the optical signal that can be propagated through the optical transmission line and the resulting lower optical intensity in turn requires that optical regenerators be spaced closer together than might be the case if an optical source having greater intensity could be used.

The amount of backscattered light is a direct function of the optical intensity and an inverse function of the optical bandwidth of the source. Thus, optical sources having narrow bandwidths experience more backscattered light than do optical sources of the same intensity but wider bandwidths Yet another disadvantage of the above approach is that optical signals propagating through fiber-optic transmission lines undergo optical dispersion; that is, the propagation velocity in optical fiber is a function of wavelength. This leads to a broadening of transmitted light pulses as they propagate along the fiber. The broadening results in signal distortion and leads to intersymbol interference (ISI), and an increase in bit-error rate (BER), and/or a reduction in useable transmission bandwidth. The amount of dispersion is a direct function of the optical path length. Thus, optical dispersion leads to reduced spacing between optical regenerators.

In the case of SONET protocol, the payloads in the optical cable use standard bit rates of 51.84 Mb/s (optical carrier level 1 or OC1), 155.52 Mb/s (OC3), 622.08 Mb/s (OC12), 1.244 Gb/s (OC24), and 2.488 Gb/s (OC48) and above. The corresponding electronic interfaces are designated as synchronous transport level 1 (ANSI=STS-1), STS-3 equivalent to synchronous transport module level 1 (CCITT=STM-1), STS-12/STM-4, STS-24, and STS-48/STM-16, respectively and above. Much of the original single mode fiber deployed is unable to transport payloads in the Gb/s range.

U.S. Pat. No. 4,477,423, issued Oct. 16, 1984 to Edward F. Carome and one of the present inventors', Charles M. Davis, prior and hereby incorporated by reference, discloses a technique of using optical phase modulation to detect electric fields. An interferometer configuration is used.

U.S. Pat. No. 4,755,668, issued Jul. 5, 1988, to one of the present inventors', Charles M. Davis, prior and hereby incorporated by reference, discloses optical phase modulation interferometer techniques for use with a plurality of sensors where the optical signal corresponding to each sensor is separately and individually distinguished by a fixed optical phase difference. A separate and individual interferometer configuration is used for each sensor. These interferometers are distinguished from each other by the path length differences between the two arms of the interferometers.

U.S. Pat. No. 4,728,191, issued Mar. 1, 1988, to one of the present inventors', Clarence J. Zarobila, prior and hereby incorporated by reference, discloses the use of phase-compensation interferometry employing a 3×3 coupler/splitter.

The following patents disclose various other phase modulation techniques for use with telecommunications and/or sensors:

| Patent No. | Inventor |
| --- | --- |
| 4,699,513 | Brooks et al |
| 4,848,906 | Layton |
| 4,860,279 | Falk et al |
| 4,866,698 | Huggins et al |
| 4,822,775 | Coleman |
| 5,191,614 | LeCong |
| 5,223,967 | Udd |

Although the above and other techniques have been generally useful, they have often been subject to one or more disadvantages. For example, the capacity to carry a high bit rate payload within a single transmission path, such as optical fiber, is often limited. Generally, add/drop[/insert] operations (picking off a signal and inserting another signal) at an intermediate stage in a transmission path require complex electronics. Some techniques provide questionable security for transmission of telecommunications such as audio, video, and/or data. Some techniques do not readily or easily provide full duplex transmission within a single fiber. Some prior techniques do not readily allow redundant transmissions. Most techniques do not allow simultaneous transmission of the various different protocols. Most techniques do not allow simultaneous transmission of analog and digital data. Most techniques require complex, high speed digital electronics in order to transmit high Mb/s and Gb/s payloads.

OJECTIVES AND SUMMARY OF THE INVENTION

Accordingly, it is a primary object of the present invention to provide a new and improved optical telecommunication system.

A more specific object of the present invention is to provide an optical telecommunication system with a high capacity.

A further object of the present invention is to provide an optical telecommunication system with a reduced number of optical components for multiplexing various payloads on the same optical transmission path and demultiplexing various payloads from the same optical transmission path.

Still another object of the invention is to provide a simplified means for separately and individually optically inserting and dropping a portion of the optical payload in an optical transmission path.

An additional object of the present invention is to provide an optical telecommunication system wherein the increase in BER and/or reduction in useable transmission bandwidth due to dispersion in the transmission optical fiber is effectively eliminated.

Still an additional object of the present invention is to provide an optical telecommunication system wherein the spacing between optical regenerators can be increased as a result of reduced Brillioun scattering and/or optical dispersion.

Yet another object of the present invention is to provide an optical telecommunication system avoiding or minimizing the disadvantages discussed above with respect to various prior techniques and where optical paths, such as optical fibers, have more utility than simply serving as dumb links.

The above and other features of the present invention which will be more readily understood when the following detailed description is considered in conjunction with the accompanying drawings are realized by an optical telecommunication system having a first transmission unit operably connected to a first receiver unit by a transmission path having a first end adjacent to the first transmission unit and a second end adjacent to the first receiver unit. The first transmission unit has one or more sources of radiant energy with a coherence length. The source or sources may or may not be included in the first transmission unit. The first transmission unit further includes N+1 optical paths, where one path is used as a reference and the remaining N paths are used to introduce N signals individually and separately to the N paths and means for dividing radiant energy from the source or sources into the N+1 portions for passage respectively along the N+1 paths and for recombining the N+1 portions after passage along the N+1 paths and N paths are selected such that their lengths separately and individually differ from the reference path by amount $\Delta L_1, \Delta L_2, \ldots \Delta L_N$, respectively, where all such path length differences are greater by a factor of five (or less) than the coherence length, and any difference $\Delta L_k - \Delta L_j$ must be greater by a factor of five or less than the coherence length and not equal to any other path length difference $\Delta L_1, \Delta L_2, \ldots \Delta L_N$. For simplicity, the N−1 paths as used herein will refer to N−1 paths in the transmission unit. The first transmission unit further includes a phase modulator in each of the N paths operable for applying a telecommunications signal to the respective portion of light in that optical path. These N+1 paths and the corresponding N phase modulators and the means for dividing the radiant energy from the source into the N+1 portions and the means for recombining the N+1 portions may be implemented as single-mode optical fiber or single-mode integrated optical waveguides formed on a suitable electro-optic substrate such as lithium niobate or gallium arsenide.

In one embodiment, the means for dividing and recombining, and the N+1 paths are part of N Mach-Zehnder configurations each of which consists of two paths one path of which is the reference path and the other path of which is one of the remaining N paths. Since, the same identical path constitutes the reference for all N Mach-Zehnder configurations in that embodiment, N+1 paths is all that is needed for forming the N Mach-Zehnder configurations instead of the 2N paths required for N separate and individual Mach-Zehnder configurations. This results in a reduction of N−1 paths thereby allowing nearly twice the number of Mach-Zehnder configurations to be configured as single-mode optical waveguides formed on a suitable electro-optic substrate such as lithium niobate or gallium arsenide. The means for dividing and recombining includes a coupler/splitter having one input port and N+1 output port, hereafter identified as a 1×(N+1) splitter connected to split the radiant energy into the N+1 portions and a (N+1)×1 coupler/splitter to recombine the N+1 portions, hereafter identified as a (N+1)×1 coupler. As used hereafter, a coupler/splitter will generally be referred to as a splitter if used for splitting signals, a coupler if used for coupling signals, and a coupler/splitter if used for both coupling and splitting signals.

In another embodiment, the means for dividing and recombining uses 1×2 splitters configured in a tree such that the radiant energy coupled into the input port of the first 1×2 splitter is divided into two portions which propagate in two optical paths one or both of which are coupled separately to the input port of a 1×2 splitter further dividing the radiant energy into three or four portions respectively which may or may not be further divided by the use of additional 1×2 splitters. Likewise, a (N+1)×1 coupler may be fabricated using 2×1 couplers.

In an optical fiber embodiment the means for dividing and recombining are a (N+1)×(N+1) splitter connected to split the radiant energy into the N+1 portions and a (N+1)×(N+1) coupler to recombine the N+1 portions. As above the (N+1)×(N+1) coupler/splitter may be fabricated from a tree of fiber optic 2×2 coupler/splitters.

In an alternate embodiment, the means for dividing and recombining N+1 paths are part of N Michelson configurations wherein one path of each Michelson configuration is the reference path and the other path in each Michelson configuration is one of the remaining N paths. Since, the same path constitutes the reference for the N Michelson configurations in that embodiment, N+1 paths constitutes N Michelson configurations instead of the 2N paths required for N separate and individual Michelson configurations. This results in a reduction of N−1 paths thereby allowing nearly twice the number of Michelson interferometer configurations to be configured on a single optical integrated substrate. The means for dividing and for recombining in this configuration is a coupler/splitter.

The first receiver unit has N separate pairs of first and second reception paths and means for reseparating the N portions for passage separately and respectively to the N pairs of first and second reception paths. Each of the first and second reception pairs has a means for dividing that portion of the radiant energy from the source into first and second portions for passage respectively along the first and second paths and for recombining the first and second portions after passage along the first and second paths. In each of the N pairs the length of the first reception path corresponds to that of the reference path in the transmission unit and the second reception path has a length that differs from the reference path by an amount $\Delta L_j \pm$ an amount less than the source coherence length (the subscript j assumes an individual value between 1 and N). No two pairs of first and second reception paths have the same $\Delta L_j$ difference. The first receiver unit further includes N first sensors separately and individually connected to the means for recombining the N pairs of first and second reception paths, each first sensor operable to sense radiant energy for detection of the telecommunication signal applied to the first transmission unit having the same $\Delta L_j$ path length difference. Each first transmission unit and the first receiver unit having the same $\Delta L_j$ path length difference collectively are an interferometer.

In one receiver embodiment, the means for dividing and recombining the first and second paths of each of the N pairs are part of a Mach-Zehnder configuration. For that embodiment, the means for dividing and recombining includes a splitter connected to split the radiant energy into the first and second portions and a coupler to recombine the first and second portions.

In an alternate embodiment, the means for dividing and recombining and the first and second paths are part of a Michelson configuration. The means for dividing and for recombining in this configuration is a coupler/splitter.

The first and second optical paths of each N pairs may be optical fibers or formed on an integrated optic substrate. The coupler/splitters may also be formed on the integrated optic substrate. Finally, more than one pair and the corresponding coupler/splitters may be combined on the same integrated optic substrate.

The source may be one or more lasers or superluminescent diodes (type of light-emitting diode), edge emitting light-emitting diodes, optical fiber sources or ont of these sources in combination with a fiber optic amplifier.

In one embodiment of the invention a second transmission unit constructed in like fashion as the first transmission unit is included in the system. The system further includes a transmission splitter connected to split radiant energy from the source into portions directed separately to the first and second transmission units and a transmission coupler connected to recombine radiant energy which is passed through the first and second transmission units and which is connected to the transmission path. The means to direct radiant energy to the first and second transmission units may have path length differences that are as large as a thousand coherence lengths in order that there be no path through one transmission unit that has a path length difference with respect to a path through the other transmission unit that is close to the any individual path length differences in either of the transmission units separately. A second receiver unit constructed in like fashion as the first receiver unit is operably connected to the second end of the transmission path. The first and second receiver units respectively recover signals applied to the first and second transmitter units. Both transmission units and both receiver units and the splitters used to split the radiant energy between the transmission units and between the receiver units and the coupler used to combine the radiant energy from the two transmission units may be optical fiber devices or located on the same integrated optic substrate.

In another embodiment of the invention, a second transmission unit is connected at the second end of the transmission path and a second receiver unit is connected at the first end of the transmission path. The first and second receiver units respectively recover signals applied to the first and second transmitter units such that full duplex communication is provided.

In an add/drop[/insert] embodiment of the present invention, an intermediate station is provided in the telecommunication system. The intermediate station is on the transmission path between the first and second ends. The intermediate station includes a second transmission unit operably connected to an intermediate location of the transmission path and a second receiver unit operably connected to an intermediate location of the transmission path.

In another embodiment an electro-optic switch is provided at the output of each of the transmission units in order to allow a fraction of the radiant energy to be tapped off for other transmission or diagnostic purposes.

In another embodiment an electro-optic switch is provided at the input to each receiver unit in order to allow a fraction of the radiant energy to be tapped off for other transmission or diagnostic purposes.

In another embodiment a splitter is provided at the output of each transmission unit in order to allow the radiant energy to be transmitted along two or more different transmission paths such as for redundant or for token ring applications.

In another embodiment and electro-optic switch is provided at the input to each receiver unit in order to allow the radiant energy to be received along two or more different receiver paths for redundant or token ring applications.

In another embodiment of the invention two sources of radiant energy are provided in the transmission unit for redundancy and a remotely controlled switch is provided between the sources and a first means for dividing the radiant energy into N+1 portions, said switch directs radiant energy from one or the other of the optical sources to the means for dividing the radiant energy into the N+1 portions.

The electro-optic switches and splitters in the above embodiments may be configured on the same integrated optic substrates as the transmission and receiver units.

The present invention may alternatively be described as an optical telecommunication system comprising a first receiver unit as recited above.

BRIEF DESCRIPTION OF THE DRAWINGS

The above and other features of the present invention will be readily understood when the following detailed description is considered in conjunction with the accompanying drawings wherein like characters represent like parts throughout the several views and in which.

DETAILED DESCRIPTION

Figure 1:
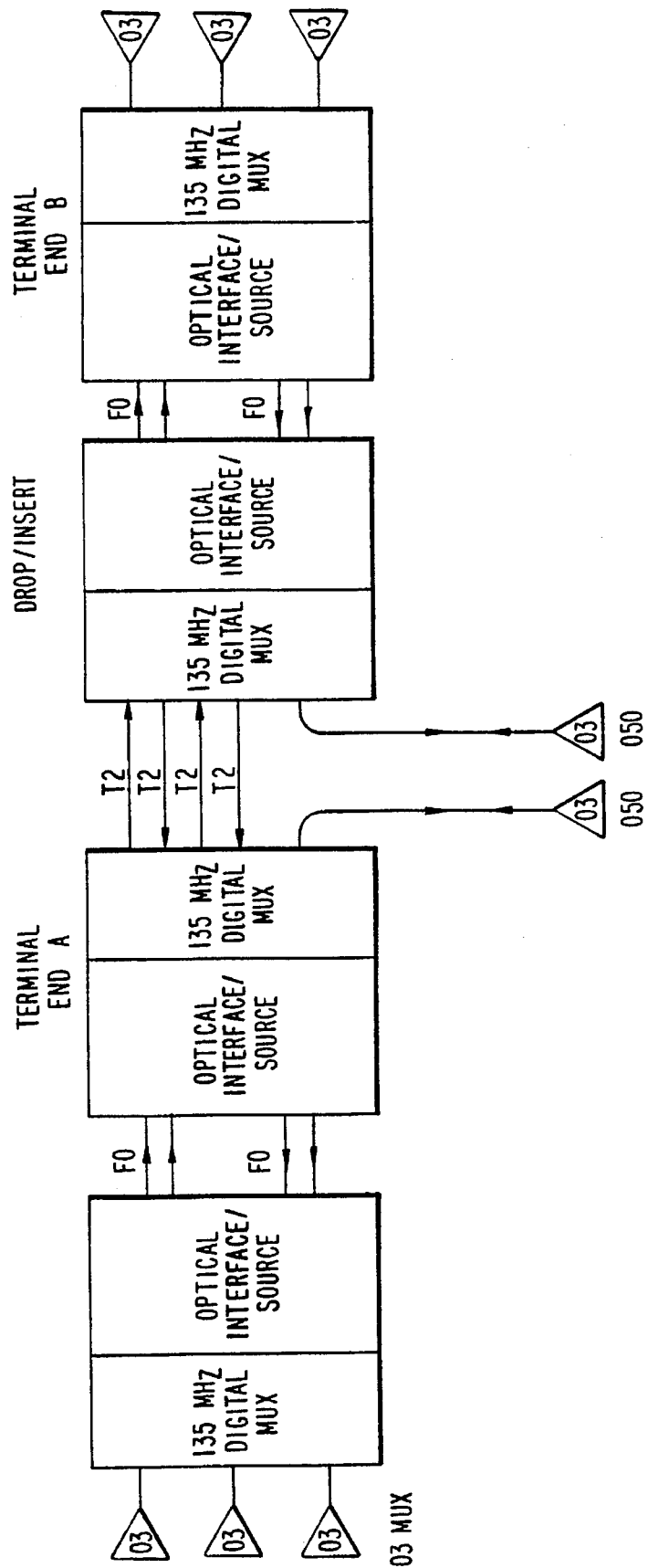
FIG. 1 shows a prior art communication system.
Figure 2:
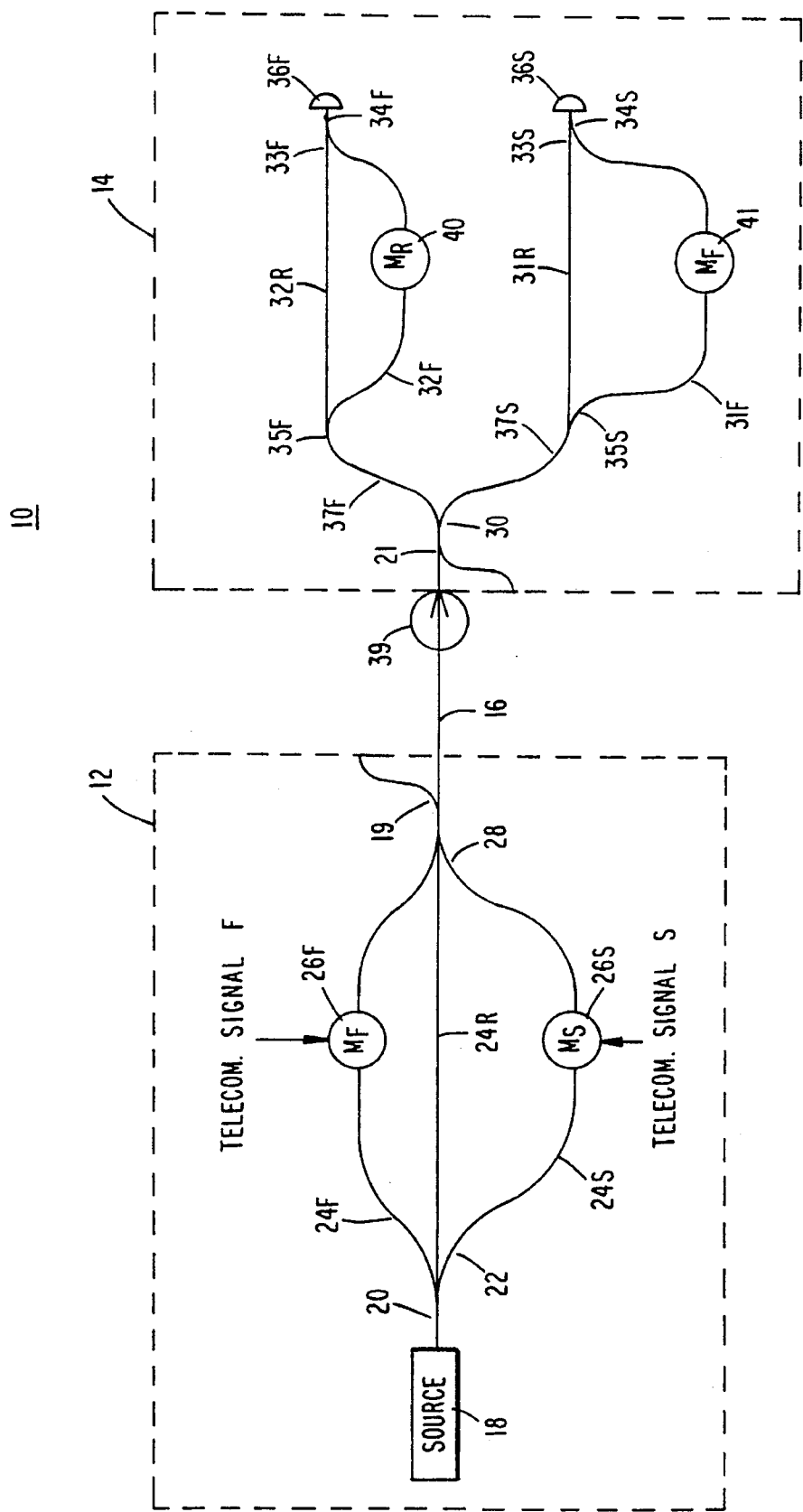
FIG. 2 shows a schematic of a first embodiment telecommunication system according to the present invention.

Turning now to FIG. 2, a first embodiment optical telecommunication system 10 according to the present invention (where N=2 corresponding to the simplest such embodiment) is shown as including a transmitter unit 12 connected to a receiver unit 14 by way of a transmission path 16, which is shown as an optical fiber.

The transmitter unit 12 includes a source 18 of radiant energy connected by a source path 20 (which may be either an optical fiber or integrated optic waveguide) to a 1×3 branching waveguide coupler/splitter (or 3×3 fiber-optic coupler/splitter). As used hereafter, a coupler/splitter will generally be referred to as a splitter if used for splitting signals, a coupler if used for coupling signals, and a coupler/splitter if used for both coupling and splitting signals. The splitter 22 divides radiant energy from the source 18 into first, second, and third portions which travel down first, second, and third optical paths 24F, 24R, and 24S respectively. Optical path 24F is greater than optical path 24R by an amount $\Delta L_1$ which is about five times the coherence length of the source 18 but may be less and has a phase modulator 26F for applying a telecommunication signal to the first portion of the radiant energy passing through optical path 24F. Optical path 24S is greater than optical path 24R by an amount $\Delta L_2$ that is greater than $\Delta L_1$ by about five times the coherence length of the source 18 but may be less and has a phase modulator 26S for applying a second telecommunication signal to the second portion of radiant energy passing through optical path 24S. The optical paths 24F, 24R, and 24S may be optical fibers or integrated optic waveguides. The first, second, and third portions of radiant energy travelling respectively along paths 24F, 24R, and 24S are recombined by coupler 28.

The configuration for the transmitter unit 12 will be recognized as two Mach-Zehnder interferometers sharing a common reference arm 24R.

The splitter 22 and coupler 28 collectively serve as a means for dividing and recombining the radiant energy from source 18 into the first, second, and third portions.

The optical phase modulators 26F and 26S may be integrated electro-optic, electrostrictive, piezoelectric or acousto-optic devices or some other such family of phase modulators. The preferred embodiment is the integrated electro-optic phase modulator formed on a suitable electro-optic substrate such as lithium niobate or gallium arsenide. The phase modulators 26F and 26S together with optical paths 24F, 24R, and 24S (that may be constructed as integrated optic waveguides on the electro-optic substrate), source 18, source path 20, splitter 22, and coupler 28 may all be part of the single electro-optic substrate. In that case, the source 18 would preferably be a superluminescent diode. Superluminescent diodes exhibit typical coherence lengths of about 20 μm. Although the transmission units are shown as Mach-Zehnder configuration units, they alternatively may be Michelson or other configurations. Where the paths 24F, 24R, and 24S are realized by optical fibers, the source 18 would usually be a low coherence length single mode laser having a typical coherence length of a few centimeters.

The signals on transmission path 16 enter into the first side of a splitter 30 within receiver unit 14. At the second side (right side in FIG. 2) of splitter 30, light is supplied to two different optical reception paths 37F and 37S. The portion of light in 37F is divided by splitter 35F into paths 32R and 32F and recombined by coupler 33F. Optical path 32F is greater than optical path 32R by an amount $\Delta L_1$. The output of coupler 33F (the right side in FIG. 2) is delivered to sensor 36F in order to recover the signal introduced by modulator 26F. The portion of light in 37S is divided by splitter 35S into paths 31R and 31S and recombined by coupler 33S. Optical path 31S is greater than optical path 31R by an amount $\Delta L_2$. The output of coupler 33S (the right side in FIG. 2) is delivered to sensor 36S in order to recover the signal introduced by modulator 26S. In certain embodiments, it may be desirable to include means for adjusting the optical path length of one of each pair of receiver paths. Modulators may be located in one optical receiver path of each pair for this purpose. The adjustment voltage could be applied by manual means or by means of a suitable feedback circuit of a type well known in this art. In FIG. 2 modulators 40 and 41 are shown located in paths 32F and 31F, respectively. Although not shown in other embodiments, such modulators may be used with each receiving unit discussed below if needed.

That portion of light which passes through transmitter path 4R and receiver path 32F travels the same distance (to within a quantity less than the coherence length of the source 18) as that portion of light that passes through transmitter path 24F and receiver path 32R. Likewise, that portion of light that passes through transmitter path 24R and receiver path 31S travels the same distance (to within a quantity less than the coherence length of the source 18) as that portion of light which passes through transmitter path 24S and receiver path 31R. Accordingly, the light applied to sensors 36F and 36S will have interference patterns dependent upon the phase modulation introduced by phase modulators 26F and 26S, respectively, thus containing the telecommunication signals.

The sensors 36F and 36S, which may be photodetectors, convert the light into electrical signals which contain the information introduced by means of modulators 26F and 26S.

An optical isolator 39, which passes light in one direction only, is used to block light from travelling back out of the receiving unit. Although not shown in other embodiments, such an isolator may be used with each receiving unit discussed below, especially in the duplex arrangements or in arrangements where secure communications are sought.

Item 19 in the transmission unit 12 and item 21 in receiver unit 14 are alternate paths provided by means of an electro-optic switch or coupler/splitter. Although not shown in other embodiments items 19 and 21 may be used with each receiving and transmission unit.

Figure 6:
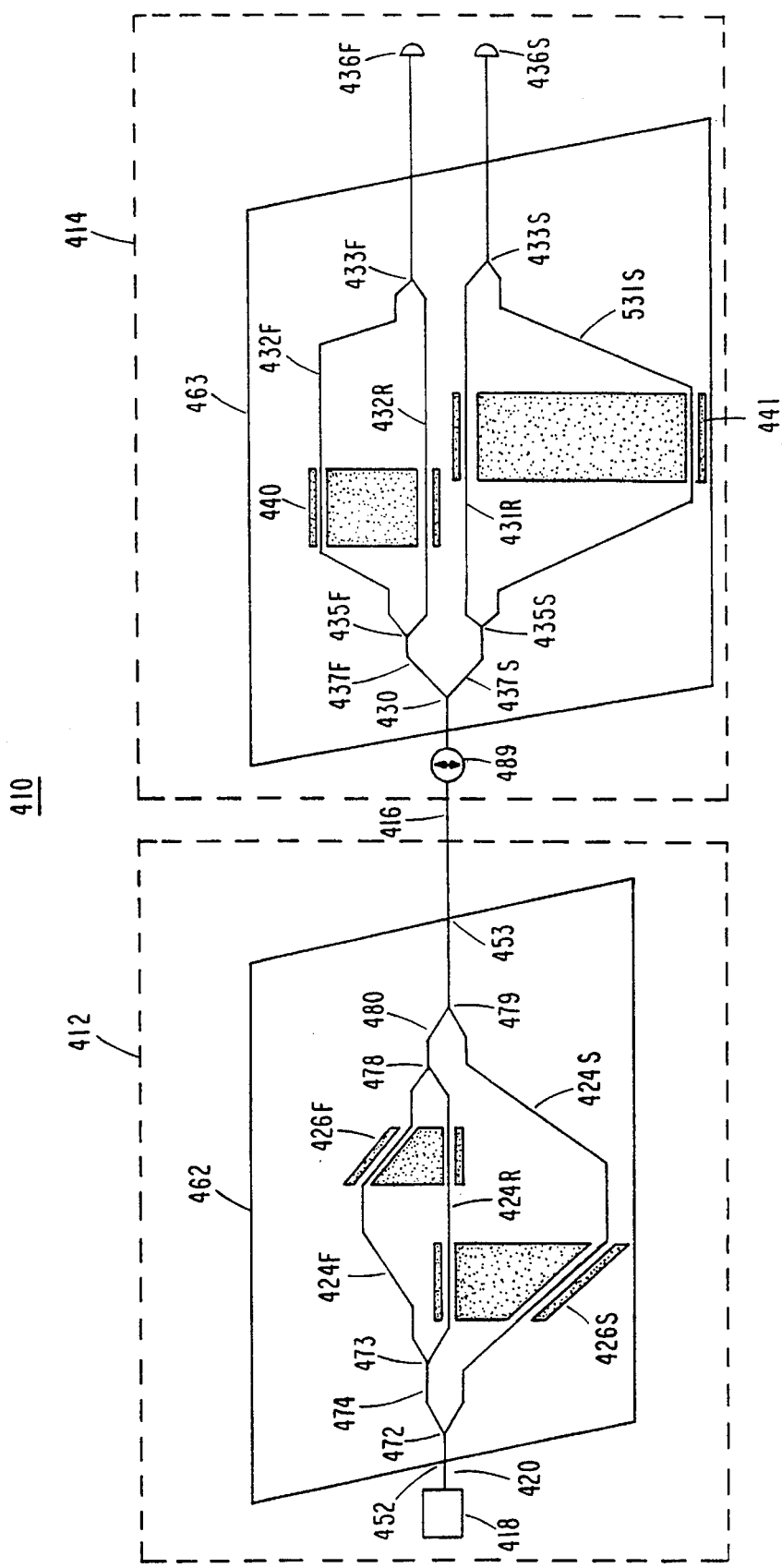
FIG. 6 shows a fifth embodiment of the telecommunication system wherein the 1×3 splitter and 3×1 coupler in the transmitter are replaced by a pair of 1×2 splitter and a pair of 2×1 couplers

Turning now to FIG. 6, an arrangement for splitting the radiant energy into three paths and recombining them is shown which is simpler to fabricate on an integrated optical chip (IOC) than is the arrangement using a 1×3 splitter 22 and a 3×1 coupler 28 shown in FIG. 2. The components in the telecommunications system 410 shown in FIG. 6 are numbered in the 400 series and have the same last two digits as corresponding components if any in the FIG. 2 embodiment. The transmitter unit 412 includes a source 418 of radiant energy connected by a source path 420 through port 452 of IOC 462 to a 1×2 splitter 472. The splitters 472 and 473, the couplers 478 and 479, as well as paths 474, 424S, 424R, 424F, and 480 are fabricated on IOC 462. The optical path 420 consists of polarization maintaining (PM) fiber. PM fiber readily propagates radiant energy polarized in one direction, hereafter known as the optimum direction of polarization, but not radiant energy whose direction of polarization is perpendicular to the optimum direction. Light from a coherent source is usually partially polarized. Since IOCs only propagate light whose direction of polarization is parallel to their surface hereafter known as the preferred direction, in order to ensure that the light inserted into IOC 462 is a maximum it is necessary for path 420 to use PM optical fiber attached to both the source 418 and the transmitter 412 IOC 462 such that the direction of maximum polarization, if any, of source 418, the optimum direction of path 420, and the preferred direction of IOC 462 coincide. The splitters 472 and 473 divide radiant energy from the source 418 into first, second, and third portions which travel down first, second, and third optical paths 424S, 424F, and 424R respectively. The radiant energy through optical paths 424F and 424R is recombined by a 2×1 coupler 478 into optical path 480. The radiant energy in optical paths 480 and 424S is recombined by a 2×1 coupler 479 and inserted into the first end of the transmission path 416.

The splitters 472 and 473 and the couplers 478 and 479 collectively serve as a means for dividing and recombining the radiant energy from source 418 into the first, second, and third portions.

Optical path 424F is greater than optical path 424R by an amount $\Delta L_1$ which is about five times the coherence length of the source 418 but may be less and has a phase modulator 426F for applying a telecommunication signal to the second portion of the radiant energy passing through optical path 424F. Optical path 424S is greater than the optical path made from the sum of optical paths 474, 424R and 480 by an amount $\Delta L_2$ that is greater than $\Delta L_1$ by about five times the coherence length of the source 418 but may be less and has a phase modulator 426S for applying a second telecommunication signal to the first portion of radiant energy passing through optical path 424S. The radiant energy exits IOC 462 through port 453 into the first end of transmission path 416.

The radiant energy through transmission path 416 exits from the second end into the receiver 414. An optical polarization adjustor 489 is shown at the input to receiver 414 IOC 463. The purpose of polarization adjustment is to prevent signal fading associated with changes in the state of polarization in the transmission optical fiber 416. Signal fading occurs because IOCs only propagate radiant energy polarized in the preferred direction of the chip. Thus, if the direction of maximum polarization of the radiant energy in the transmission fiber 416 is allowed to wander relative to the preferred direction in the channel waveguide, then the intensity of the radiant energy in the channel waveguides of IOC 463 will fluctuate. Thus, it is important to orient the direction of maximum polarization, if any, of the light that exits transmission fiber 416 into receiver IOC 463 in the preferred direction. This is accomplished by the use of an optical polarization adjustor 489. Receiver 414 is constructed and operates in the same fashion as receiver 14 of FIG. 2.

Figure 7:
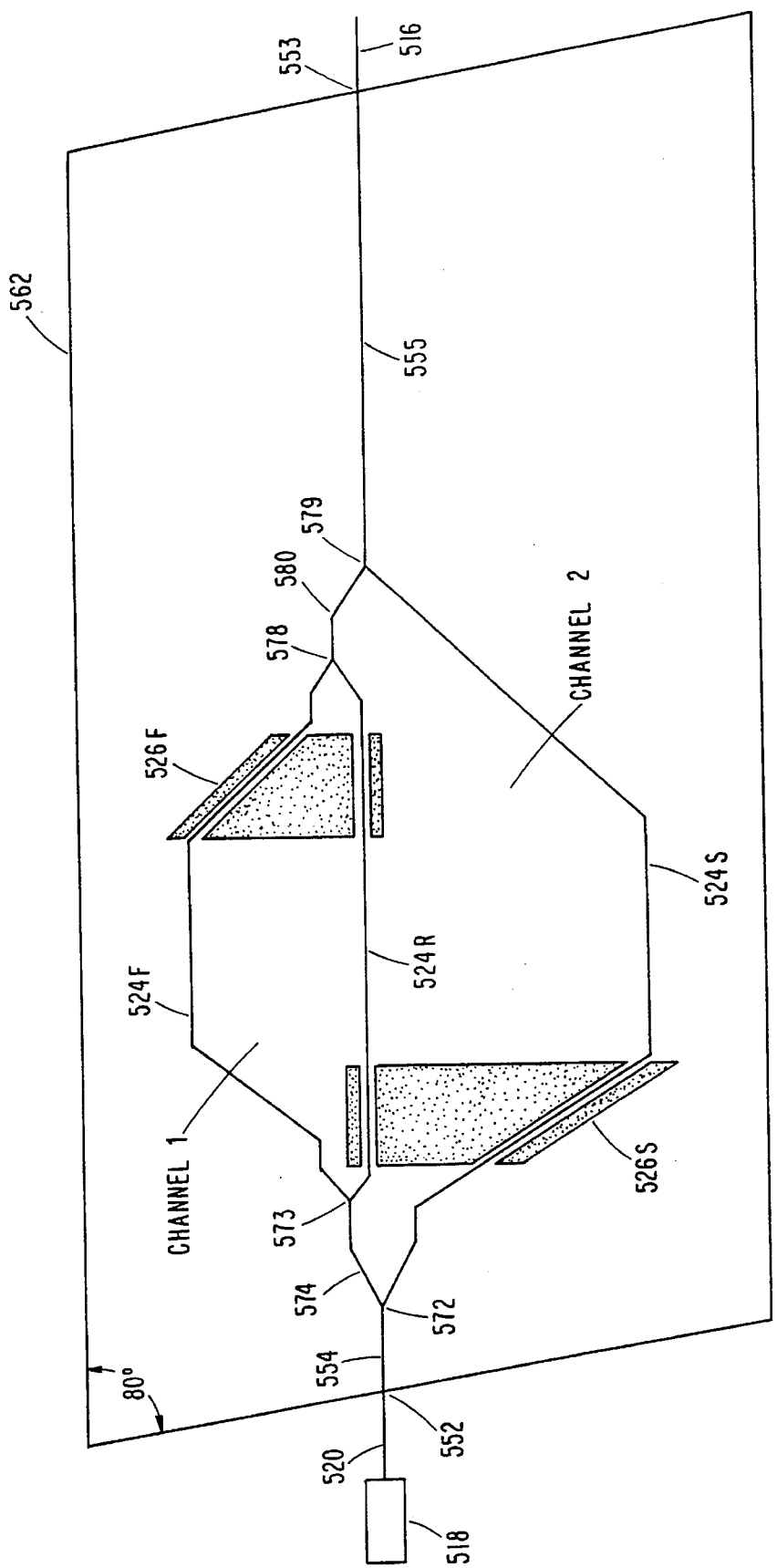
FIG. 7 shows a schematic of a transmitter integrated optical chip.

FIG. 7 shows a schematic of the transmitter IOC 462 of FIG. 6. The components in the transmitter IOC 562 shown in FIG. 7 are numbered in the 500 series and have the same last two digits as corresponding components, if any, in the FIG. 6 embodiment. Radiant energy from the source 518 is inserted into PM optical fiber 520. PM fiber that has been pigtailed to source 518 with the optimum direction of polarization of the PM optical fiber 520 parallel to the direction of maximum polarization, if any, of the source 518. Radiant energy in PM fiber 520 with its direction of maximum polarization, if any, oriented parallel to the preferred direction of the IOC 562 is inserted into path 554 through port 552. In IOC 462 the optical paths are channel waveguides. Splitters 572 and 573 divide radiant energy from the source into first, second, and third portions which travel down the first, second, and third paths 524S, 524F, and 524R respectively. The radiant energy through optical paths 524F and 524R is recombined by a 2×1 coupler 578 into path 580. The radiant energy in paths 580 and 524S is recombined by a 2×1 coupler 579 into path 555 which exits through port 553 into the first end of the transmission path 516.

The splitters 572 and 573 and the couplers 578 and 579 collectively serve as a means for dividing and recombining the radiant energy from source 518 into the first, second, and third portions.

Optical path 524F is greater than optical path 524R by an amount $\Delta L_1$ which is about five times the coherence length of the source 518 but may be less and has a phase modulator 526F for applying a telecommunication signal to the second portion of the radiant energy passing through optical path 524F. Optical path 524S is greater than the optical path made from the sum of optical paths 574, 524R and 580 by an amount $\Delta L_2$ that is greater than $\Delta L_1$ by about five times the coherence length of the source 518 but may be less and has a phase modulator 526S for applying a second telecommunication signal to the first portion of radiant energy passing through optical path 524S.

Figure 8:
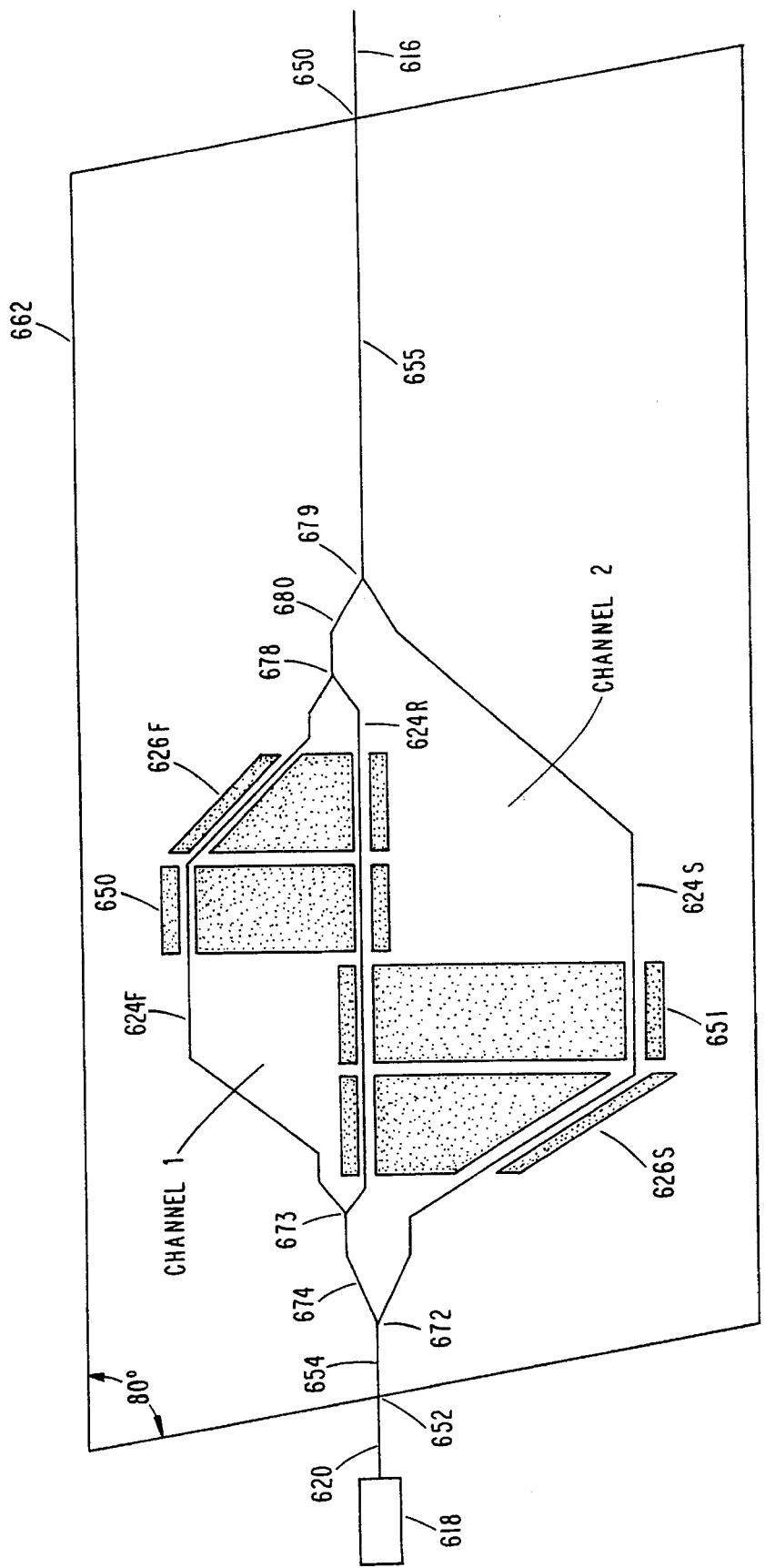
FIG. 8 shows a second embodiment of the integrated optical chip where bias voltages are applied by means of additional electrodes.

FIG. 8 shows second embodiment of the transmitter IOC 562 of FIG. 7. Components in transmitter IOC 662 in FIG. 8 are numbered in the 600 series and have the same last two digits as corresponding components, if any, in the FIG. 7 embodiment. IOC 662 is constructed is the same manner as IOC 562 of FIG. 7 except IOC 662 has electrodes 650 and 651 located in paths 624F and respectively to apply a bias voltage, if required, across paths 624F and 624S in order to insure that the telecommunication signals applied by phase modulators 626F and 626S are applied at the point of maximum linearity which corresponds to a phase of 90° for the radiant energy whose electric field vector is varying sinusoidally.

Figure 9:
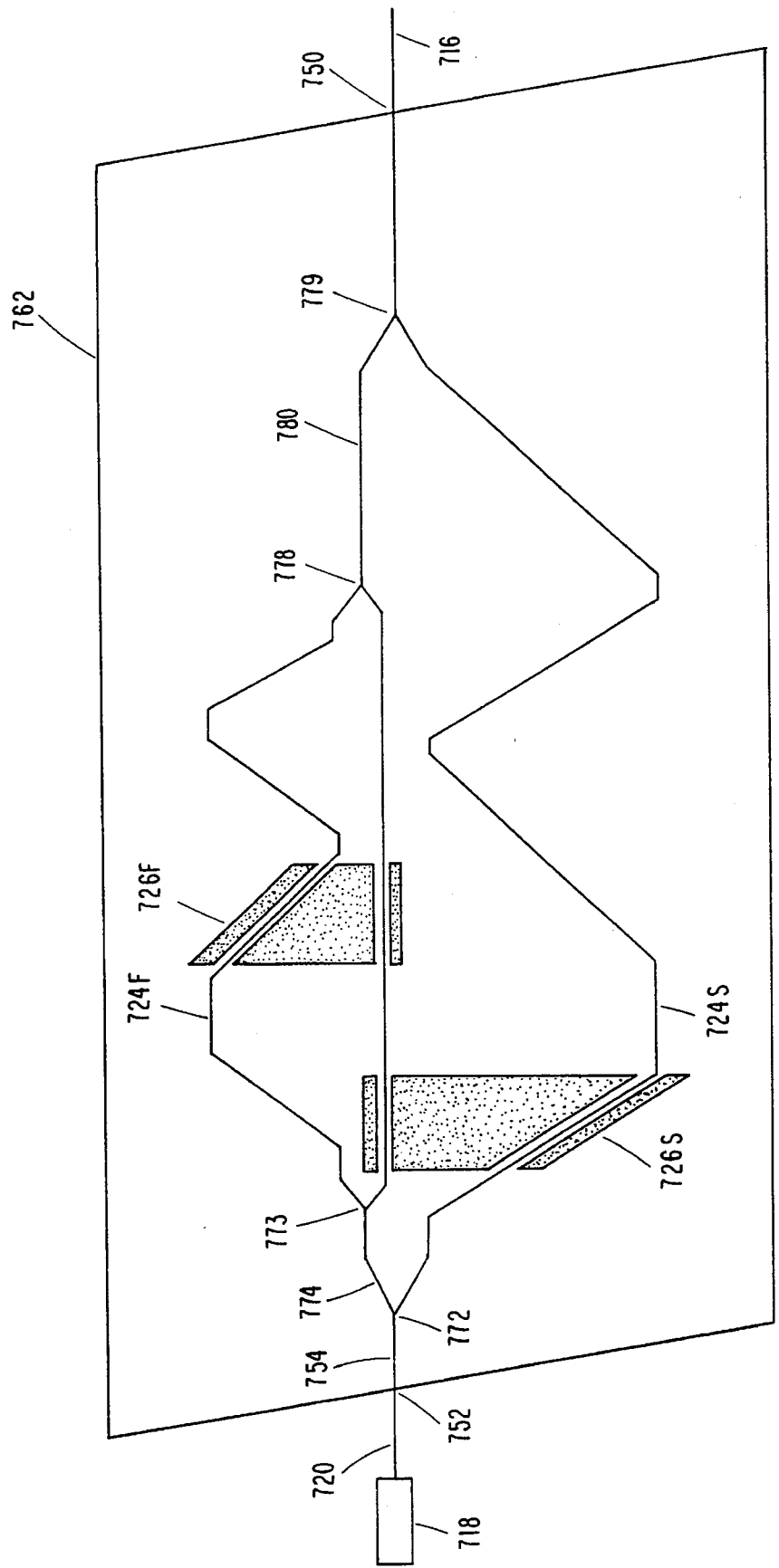
FIG. 9 shows a third embodiment transmitter integrated optical chip designed to allow the path length differences $\Delta L_1$ and $\Delta L_2$ to be increased in magnitude.

FIG. 9 shows a third embodiment of the transmitter IOC 562 of FIG. 7. Components in transmitter IOC 762 in FIG. 9 are numbered in the 700 series and have the same last two digits as corresponding components, if any, in the FIG. 7 embodiment. IOC 762 is constructed in the same manner as IOC 562 of FIG. 7 except paths 724F and 724S are folded back on themselves in order to increase pathlength difference. $\Delta L_1$ and $\Delta L_2$. The increase in $\Delta L_1$ and $\Delta L_2$ depends on the number of folds introduced. In this embodiment paths 724F and 724S are folded back once but several folds may be introduced in order to increase $\Delta L_1$ and $\Delta L_2$ even more.

Figure 10:
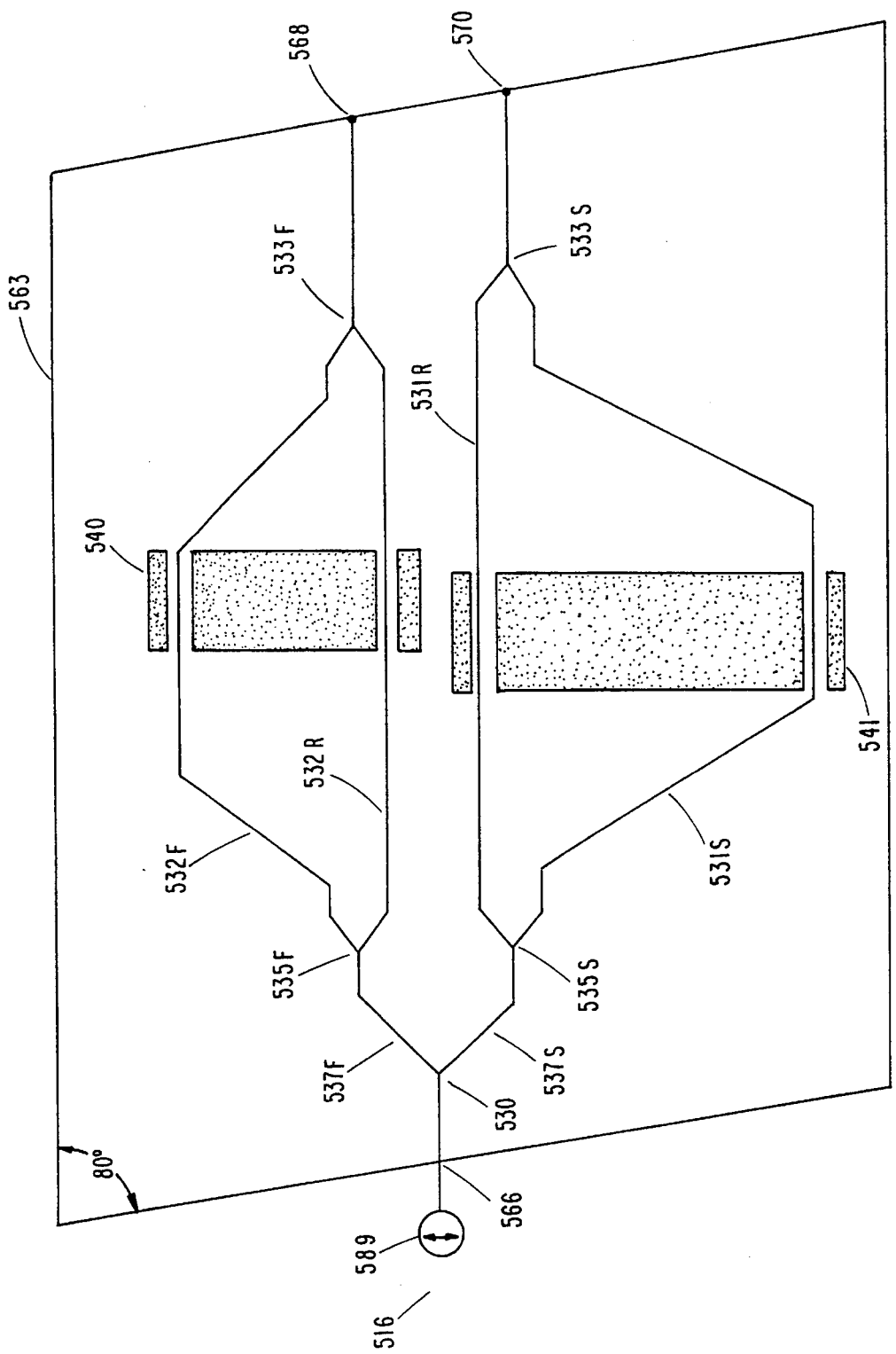
FIG. 10 shows a schematic of a receiver integrated optical chip.

FIG. 10 shows a schematic of receiver IOC 463 of FIG. 6. Components in receiver IOC 563 shown in FIG. 10 are numbered in the 500 series and have the same last two digits as corresponding components, if any, in the FIG. 6 embodiment. Radiant energy from transmission path 516 enters polarization adjustor 589. Radiant energy from polarization adjustor 589 enters port 566 of IOC 563 with its direction of maximum polarization if any parallel to the preferred direction of IOC 563. Splitter 530 divides radiant energy into two portions which travel down optical paths 537F and 537S. Divider 535F divides the portion of radiant energy through path 537F into first and second portions which travel down first and second optical paths 532F and 532R respectively. Electrode 540 is provided in order to introduce a bias if needed; however in some embodiments it may be omitted. Coupler 533F recombines the first and second portions of radiant energy and delivers it to output port 568 of IOC 563. Divider 535S divides the portion of radiant energy through path 537S into third and fourth portions which travel down first and second optical paths 531S and 531R respectively. Electrode 541 is introduced in order to provide a bias if needed; however in some embodiments it may be omitted. Coupler 533S recombines the third and fourth portions of radiant energy and delivers it to output port 570 of IOC 563.

Splitter 535F and coupler 533F collectively serve as a means for dividing and recombining the radiant energy from path 537F. Splitter 535S and coupler 533S collectively serve as a means for dividing and recombining the radiant energy from path 537S.

Figure 11:
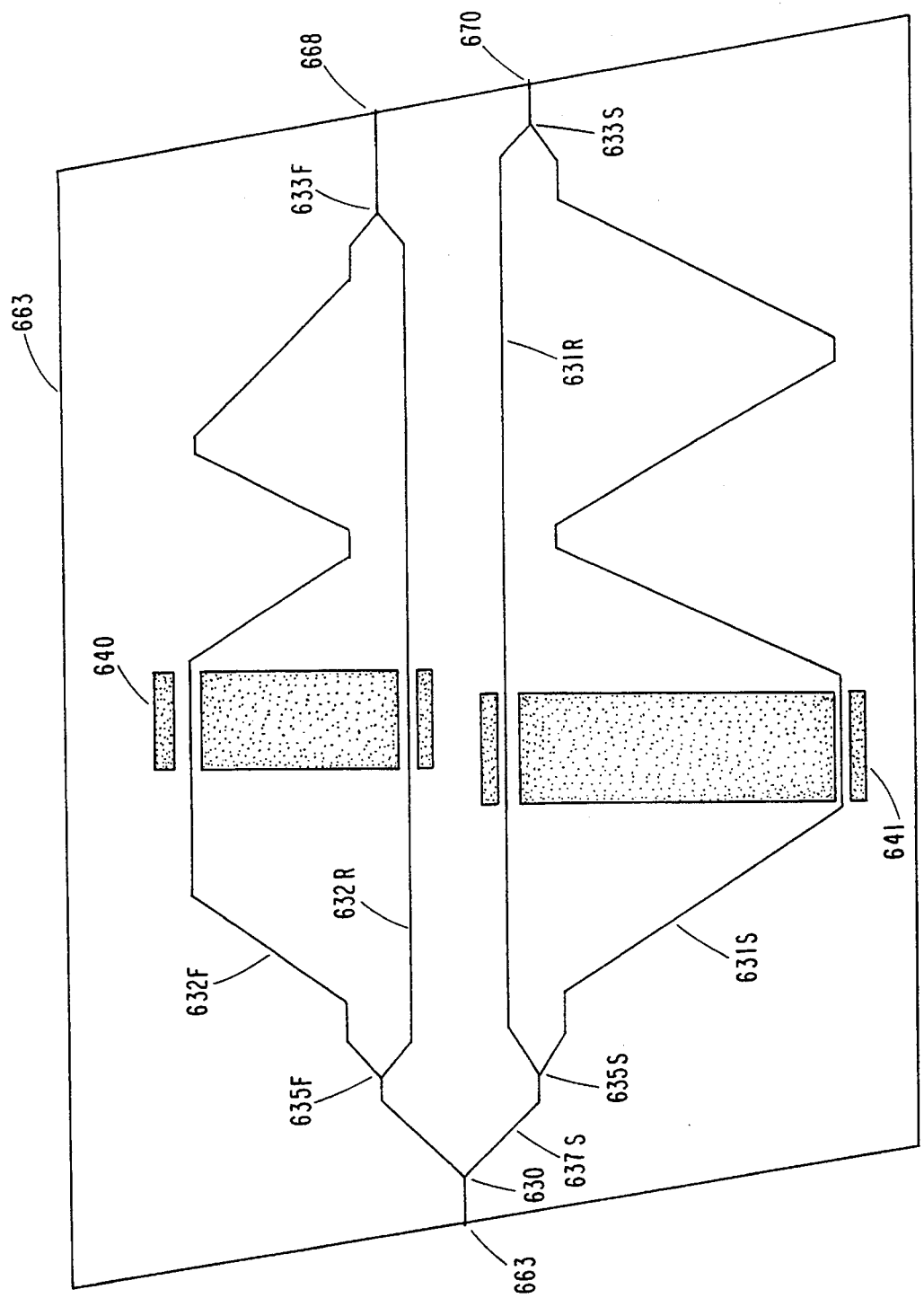
FIG. 11 shows a second embodiment receiver integrated optical chip designed to allow the path length differences $\Delta L_1$ and $\Delta L_2$ to be increased in magnitude.

FIG. 11 shows a second embodiment of the receiver IOC 563 of FIG. 10. Components in receiver IOC 663 in FIG. 11 are numbered in the 600 series and have the same last two digits as corresponding components, if any, in the FIG. 10 embodiment. IOC 663 is constructed is the same manner as IOC 563 of FIG. 10 except paths 632F and 631S are folded back on themselves in order to increase the respective path length differences. The increase in path length differences depends on the number of folds introduced. In this embodiment paths 632F and 631S are folded back once but several folds may be introduced in order to increase the respective path length differences even more.

Figure 3:
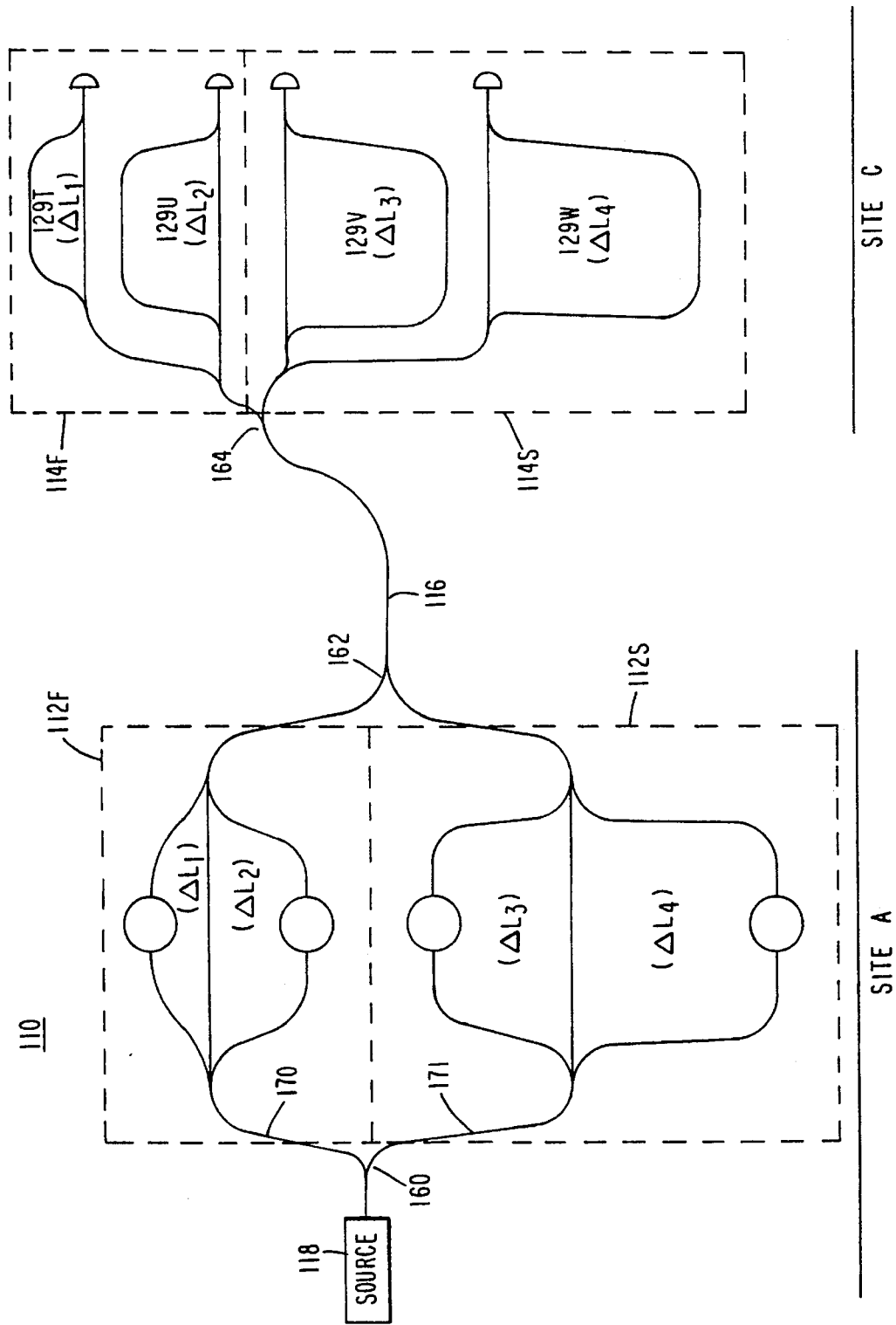
FIG. 3 shows a second embodiment telecommunication system according to the present invention in which multiple transmitters are at one end and an alternate receiving configuration is at another end.

Turning now to FIG. 3, an arrangement for multiplexing a plurality of signals at site A on transmission line 116 and demultiplexing the signals at site C is shown. The components in the telecommunications system 110 shown in FIG. 3 are numbered in the 100 series and have the same last two digits as the corresponding components, if any, in the FIG. 2 embodiment. Radiant energy from source 118 is split two ways by the 1×2 splitter 160 into paths 170 and 171. The light from splitter 160 is split in two different portions and transported through paths 170 and 171 to the corresponding first and second transmission units 112F and 112S. The lengths of paths 170 and 171 may differ by amounts equal to a 1000 times the coherence length but may be less. Such a difference in the length of paths 170 and 171 will eliminate the possibility that light through a path in transmission unit 112F will interfere with light through a path in transmission unit 112S. Each of the transmission units 112F and 112S is constructed in the same fashion as transmission unit 12 in FIG. 2 except that the transmission units of FIG. 3 do not have a source of radiant energy, but instead receive a portion of the radiant energy from source 118 by way of the splitter 160. Each of the transmission units 112F and 112S will be recognized as a pair of Mach-Zehnder interferometer configurations sharing a common reference path. The transmission units 112F and 112S are identical except that they have respective path length differences of $\Delta L_1$, $\Delta L_2$, $\Delta L_3$, and $\Delta L_4$, which are shown in parentheses within the various Mach-Zehnder configurations. The respective path length differences are sufficiently different (by an amount about five times the coherence length of the source 118 or less) from each other that each of the transmission units may apply a signal to the transmission path 116 by way of the coupler 162, but without the various signals interfering with each other. As in the arrangement of FIG. 2, the path length differences should be greater than five times the coherence length of source 118. The transmission units 112F and 112S may use integrated optic waveguides upon a single electrooptic substrate (not separately shown). Although the transmission units are shown as Mach-Zehnder configuration units, they alternately may be Michelson or other configurations.

The signals sent from site A along transmission path 116 are split by a splitter 164 at site C for passage into first and second receiver units 114F and 114S. Each of the receiver units are constructed in like fashion to receiver unit 14 of FIG. 2. However, units 114F have respectively path length differences $\Delta L_1$ and $\Delta L_2$ and units 114S have respectively path length differences $\Delta L_3$ and $\Delta L_4$ as indicated parenthetically below the numerals of the corresponding receiver units designated 129T, 129U, 129V, and 129W. Accordingly, each of the receiver units 129T, 129U, 129V, and 129W is used for detecting signals from the corresponding one of the transmission units at site A.

Although specific telecommunication signals are not shown applied to the phase modulators of the transmission units 112F, and 112S and for the embodiments discussed below, such signals would be applied to the various phase modulators in those transmission units. The signals applied may be the output of multiplexers or other devices having analog or time division multiplexed signals of various protocols. These may be mixed in any combination.

Figure 4:
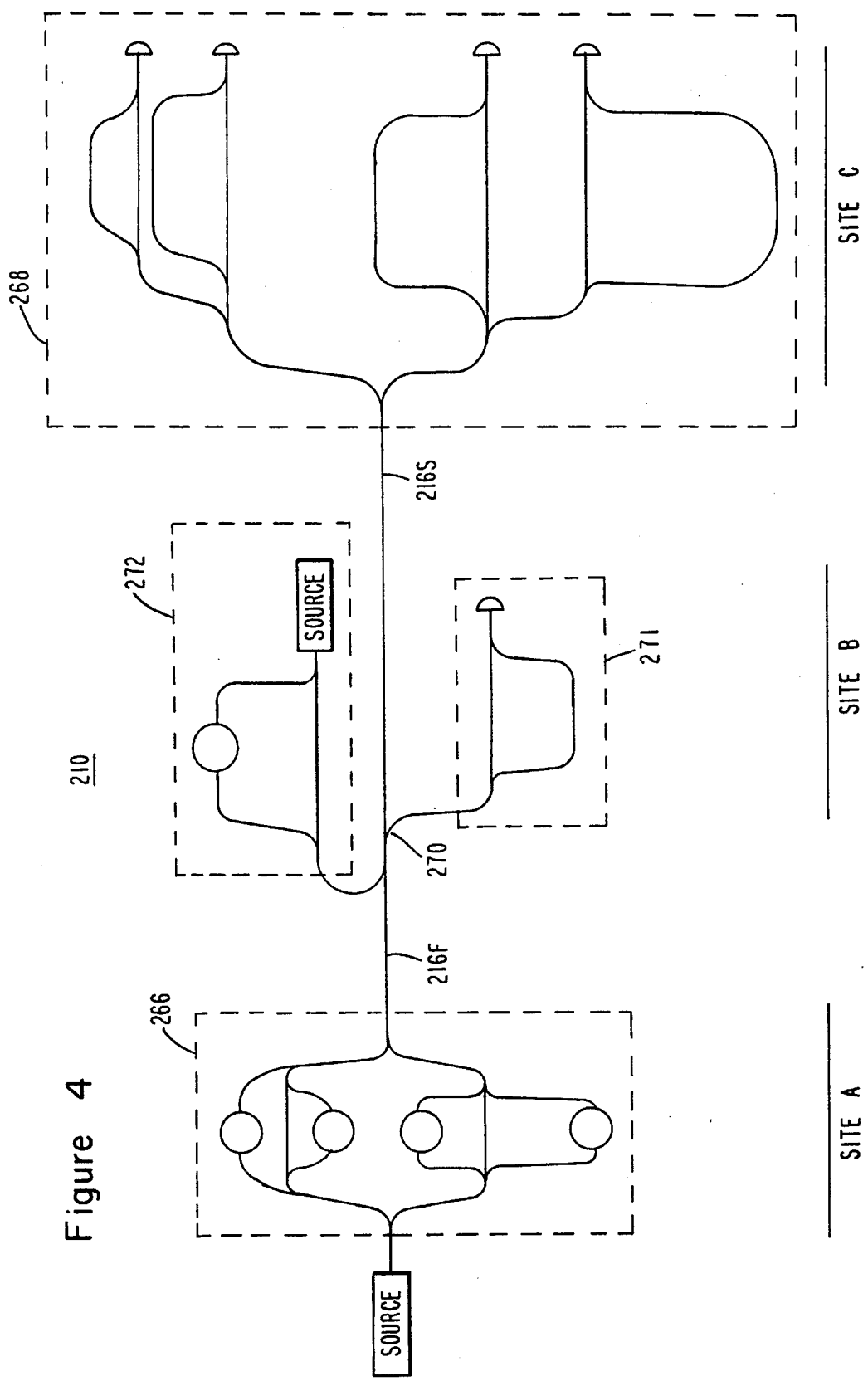
FIG. 4 shows a third embodiment telecommunications system according to the present invention wherein an add/drop[/insert] technique is obtained by use of an intermediate station.

Turning now to FIG. 4, an add/drop[/insert] configuration for the present invention is shown with components numbered in the 200 series with the last two digits as the corresponding component, if any, of the FIG. 2 embodiment. The telecommunications system 210 of FIG. 4 includes a transmitter system 266 at site A and receiver system 268 at site C which are identical respectively to the structures at sites A and C in the FIG. 3 embodiment. Therefore, these components need not be discussed in detail. The transmission path between site A and site B includes first and second portions 216F and 216S attached by a coupler/splitter 270. The 2×2 coupler/splitter 270 has one output port connected to the transmission path, such as optical fiber, 216S. Its other output port is connected to a Mach-Zehnder receiver unit 271 (constructed and operational as described with respect to one of the receiver units in 14 of FIG. 2). Unit 271 has a path length difference matching one of the transmitter units at transmitter system 266, site A and will detect signals therefrom. One of the input ports of coupler/splitter 270 is connected to transmission path 216F, whereas the other input port is connected to a transmitter unit 272, constructed and operational as described with respect to one of the Mach-Zehnder configurations in transmitter unit 12 of FIG. 2. The signals applied by transmitter unit 272 passes along transmission path 216S to site C where detection and demodulation may occur by use of a receiver unit having a path length difference corresponding to the path length difference of the Mach-Zehnder of unit 272.

An alternate embodiment includes a multiport coupler/splitter to accommodate multiple add/drop[/insert] units at the single site B Still another embodiment includes more than one intermediate add/drop[/insert] sites containing one or more transmission and receiver units.

Figure 12:
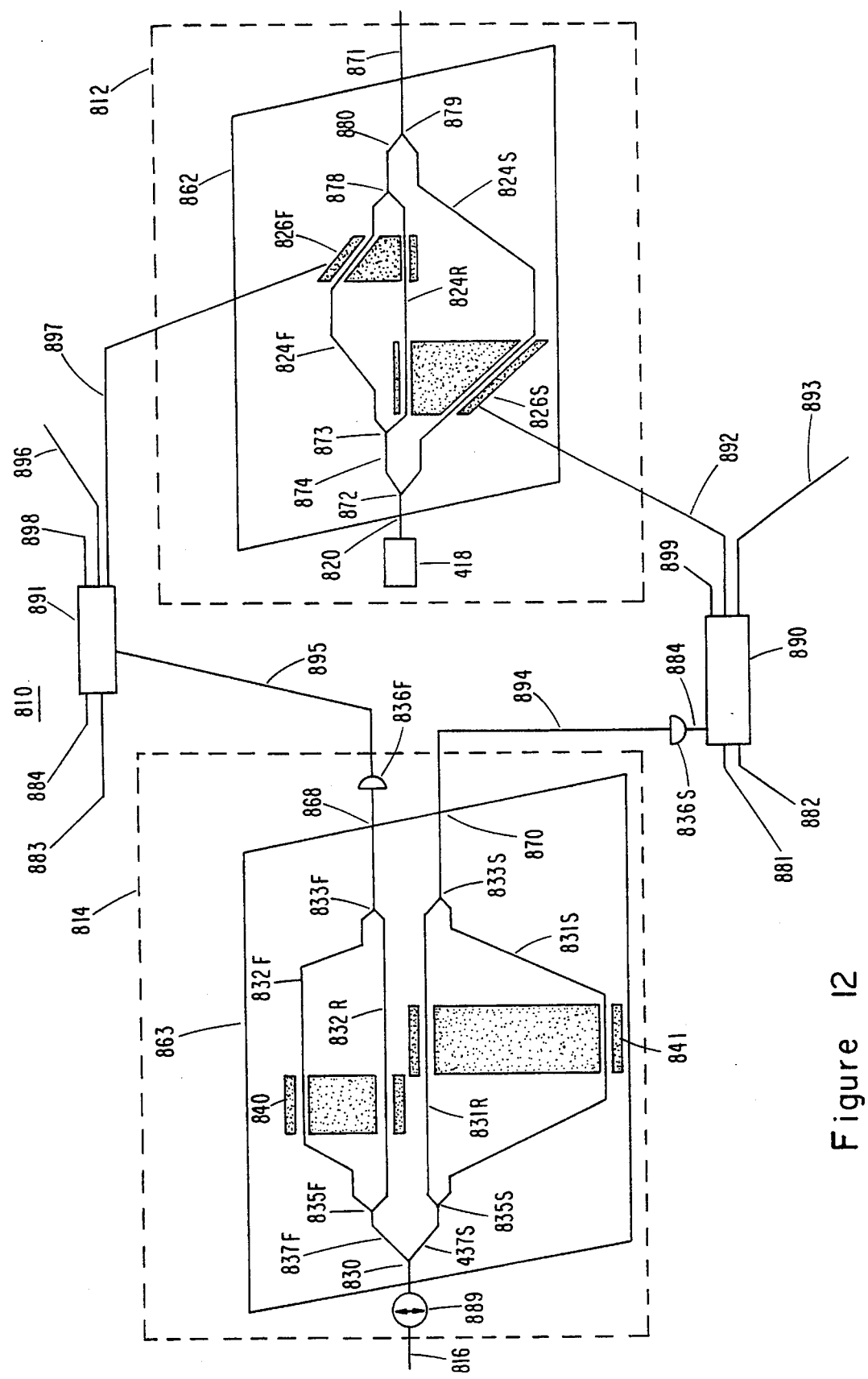
FIG. 12 shows a second embodiment of the add/drop[/insert] configuration according to the present invention wherein the add/drop[/insert] technique is obtained by use of an intermediate station utilizing a transmitter integrated optical chips and a receiver integrated optical chip back-to-back.

Turning now to FIG. 12, a second embodiment of the add/drop telecommunication system 210 of FIG. 4 is shown. Components in configuration 810 are numbered in the 800 series with the last two digits the same as the corresponding components, if any, in previous figures. Add/drop functions are obtained by use of an intermediate station utilizing back-to-back a receiver IOC 863 and a transmitter IOC 862. Said receiver IOC 863 and said transmitter IOC 862 are constructed in the same way as receiver IOC 563 of FIG. 10 and transmitter IOC 562 of FIG. 7 respectively. In this configuration the telecommunication signal carried by radiant energy from the output port 868 of receiver IOC 863 is detected by sensor 836F, which may be a photodetector, and the electrical output of said photodetector 836F is transmitted to add/drop tributary card (A/D card) 891 by electrical lead 895. The telecommunication signal carried by the radiant energy from the outport 870 of receiver IOC 863 is detected by sensor 836S, which may be a photodetector, and the electrical output of said photodetector 836S is transmitted to A/D card 890 by electrical lead 884. The radiant energy out of port 868 is converted by sensor 836F, which may be a photodetector, into an electrical signal which contains the telecommunication information carried by the radiant energy from port 868. The electrical telecommunication signal which is to be inserted is applied to electrode 826F of transmission IOC 862. Radiant energy from port 870 is introduced into tributary card 890 through transmission optical fiber 894 where the telecommunication signal carried by the radiant energy is converted by sensor 836S, which may be a photodetector, into an electrical signal which contains the telecommunication signal carried by the radiant energy from port 870. Sensor 836F may be incorporated in tributary A/D card 891 and sensor 836F may be incorporated in A/D card 890. In tributary A/D cards 890 and 891, clock and data are recovered and the original electrical telecommunication signals are regenerated. In A/D card 890, there is a means, that may be a router, for remotely directing the electrical output of said A/D 890 to either 892, 893, or 899. In A/D card 891, there is a means, that may be a router, for directing the electrical output of said A/D card 891 to either electrical lead 896, 897 or 898. Electrical leads 892 and/or 897 transmit the respective telecommunication signal from A/D cards 890 and 891 are applied to electrodes 826S and/or 826F of the transmission chip 862 through electrical lead 892 thereby modulating the third and/or first portion of radiant energy that passes through optical paths 824S and/or 824F respectively. This arrangement allows transmitter IOC 862 to retransmit the telecommunication signal from output port 868 and/or 870 of receiver IOC 863 through transmission line 871.

Alternatively, electrical leads 893 and/or 896 may be used to drop part or all of the payload that enters receiver IOC 863 from the second side of transmission path 816. In one such embodiment, conventional lasers (not shown) serving as the sources for optical fiber telemetry links are driven with regenerated telecommunication signals from output port 870 and/or 868. In another embodiment, electrical leads 898 and/or 899 are used to deliver all or part of the payload in the form of clock and data corresponding to telecommunication signals from output port 868 and/or 870 of receiver IOC 863 to conventional telecommunication equipment.

If output telecommunication signals from A/D card 890 and/or 891 are dropped, new telecommunication signals may be added by means of the corresponding electrode 826S and/or 826F respectively. Said added signals may be introduced to A/D card 891 and/or 890 in two or more ways. Optical fibers 881 and/or 884 transmitting conventional time multiplexed optical signals may be used to deliver said signals to A/D cards 890 and/or 891 where they are photodetected (said photodetectors not shown but may be either external to or incorporated directly in the respective A/D cards), regenerated and transmitted through electrical leads 892 and/or 897 to electrodes 826S and/or 826F respectively.

Electrical leads 882 and/or 883 may be used to deliver clock and data corresponding to telecommunication signals from conventional telecommunication equipment to A/D card 890 and/or 891 that regenerate the signals and transmit them to electrodes 826S and/or 826F respectively of transmitter IOC 862 through electrical leads 892 and/or 897 respectively.

Tributary cards 890 and 891 may be incorporated directly in conventional telecommunication equipment (e.g. ATM) eliminating the need to convert the data to synchronous (e.g. SONET) and/or asynchronous (e.g. DS3) formats thereby eliminating or greatly reducing the electrical and/or optical components required.

Tributary cards 890 and 891 may be incorporated in transmitter unit 812 or receiver unit 814.

Figure 5:
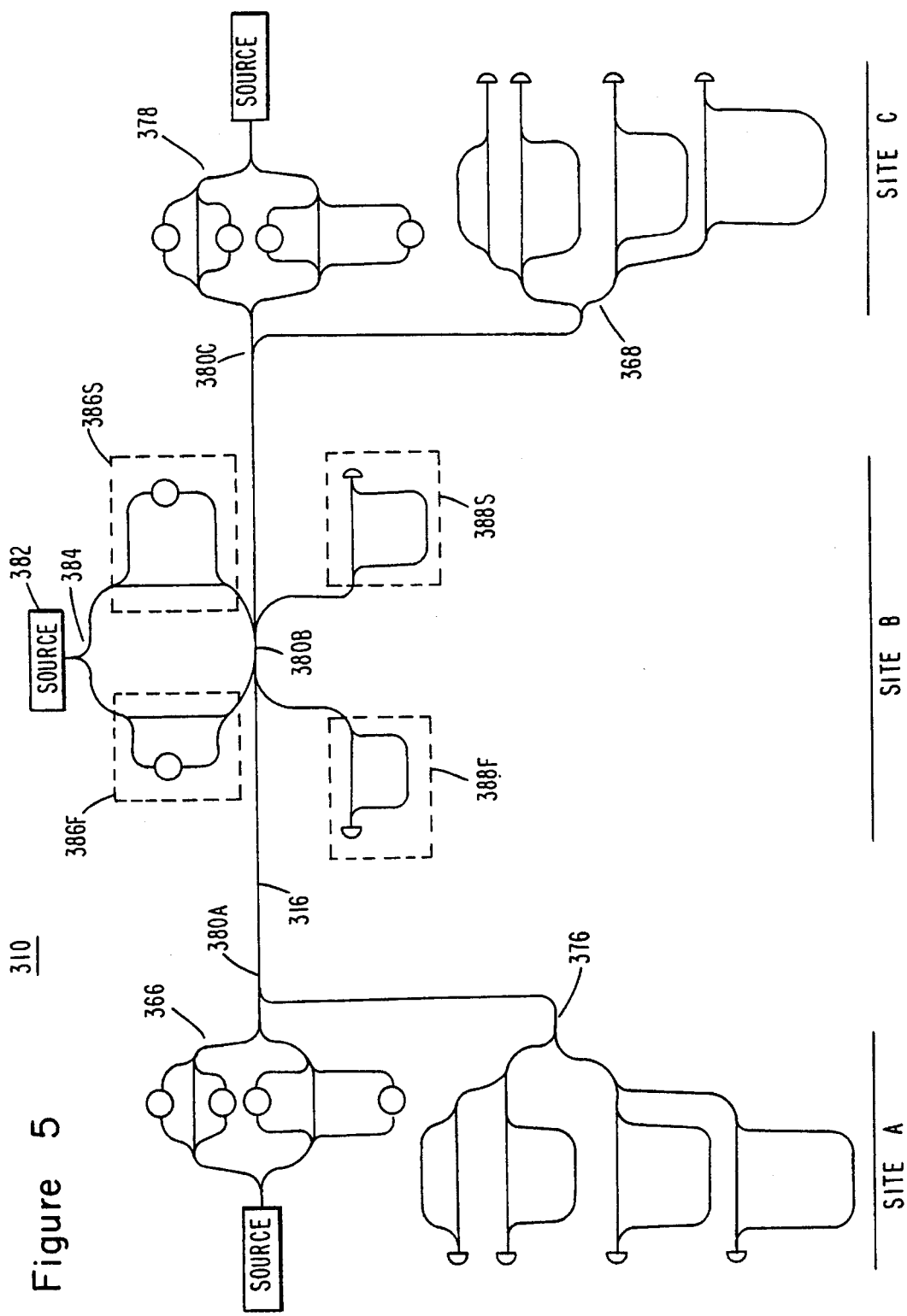
FIG. 5 shows a fourth embodiment telecommunication system according to the present invention which provides full duplex transmission and an add/drop[/insert] capability at an intermediate station.

Turning now to FIG. 5, a full duplex communication system incorporating an add/drop multiplexer is shown. The optical telecommunication system 310 of FIG. 5 has numbers in the 300 series with the same last two digits as the corresponding component, if any, from one or more of the previous embodiments. At site A, a transmission unit 366 consisting of a multiplexed arrangement of two pairs of Mach-Zehnder interferometers as shown in FIG. 3 and at site C a multiplexed arrangement of four receiver interferometers 368 similar to those shown in FIG. 3 are constructed and operational as discussed with respect to the corresponding components 266 and 268 of FIG. 4. However, since the FIG. 5 arrangement is full duplex, site A also includes an assembly 376 of four multiplexed receiver units, constructed and operational in the same fashion as receiver unit 268 described previously. Likewise, site C includes a transmission unit 378 which has two pairs of Mach-Zehnder transmitter units and is constructed and operational as discussed with respect to transmission unit 266. At site A, a coupler/splitter 380A directs communication sent to site A from site B or C towards the receiver unit 376 and allows outgoing signals from transmission unit 366 to be applied to a transmission path 316. Coupler/splitter 380C performs the same function at site C.

Site B, located intermediate sites A and C has a 3×3 coupler/splitter 380B. (The sites would, as always, be at different locations form each other). A source 382 provides radiant energy to an associated splitter 384 which supplies first and second Mach-Zehnder configuration transmission units 386F and 386S. The transmission units 386F and 386S operate in identical fashion to one of the Mach-Zehnder configurations in transmission unit 12 described in detail with respect to FIG. 2. The output from the transmission units is applied to the transmission path 316 by way of the coupler/splitter 380B. Signals intended for site B may be detected by first and second Mach-Zehnder configuration receiver units 388F and 388S, each of which is constructed and operational in similar fashion to that described for reception unit 14 of FIG. 2. Receiver 388F is used to receive signals sent by site C whereas receiver 388S is used to receive signals sent by site A.

The transmitter unit 386F is used to send signals to site C, whereas transmitter unit 386S is used to send signals to site A. As will be readily understood, the path length difference in a particular receiving unit should match the path length difference in the corresponding transmitter unit.

Although specific constructions and embodiments have been presented herein, these are for illustrative purposes only. Various modifications will be apparent to those of skill in the art. Accordingly, the scope of the present invention will be determined by reference to the claims appended hereto.

What is claimed is:

1. An optical telecommunication system including N transmission units, each comprising:

a source of radiant energy having a coherence length;

separate N+1 optical paths where N is the number of signals to be transmitted and one path is used as a reference and the other N paths are selected so that their lengths differ from the reference path by an amount $\Delta L_1, \Delta L_2, \ldots, \Delta L_N$ where all such path length differences and the differences $\Delta L_k - \Delta L_j$ (where k and j individually and separately take all values between 1 and N but $k \neq j$) are greater than five times the coherence length or less and the differences $\Delta L_k - \Delta L_j$ do not equal any path length difference $\Delta L_1, \Delta L_2, \ldots, \Delta L_N$;

means for dividing radiant energy from said source into N+1 portions for passage respectively along said N+1 optical paths and for recombining said N+1 optical portions after passage along said N+1 optical paths;

a phase modulator in each of said N optical paths operable for applying a telecommunications signal to said N portions;

said N transmission units operably connected to provide said recombined portions with phase differences corresponding to $\Delta L_1, \Delta L_2, \ldots, \Delta L_N$ to a transmission path having a first end adjacent said first transmission unit and a second end; and a first receiver unit operably connected to said second end of said transmission path and having:

N separate pairs of first and second reception paths having path length differences $\Delta L_1, \Delta L_2, \ldots, \Delta L_N$ and means for dividing the N portions for passage selectively to the N pairs of first and second reception paths;

each of the first and second reception pairs having a means for dividing that portion of the radiant energy from the source into first and second portions for passage respectively along the first and second paths and for recombining the first and second portions after passage along the first and second paths; and N first sensors separately and individually connected to the means for reseparating and recombining the N pairs of first and second reception paths, each first sensor operable to sense radiant energy for detection of the telecommunication signal applied to the first transmission unit having the same path length difference;

wherein said first transmission unit, transmission path, and said first receiver unit collectively are N interferometers, and said means for dividing comprises a tree of 1×2 splitters connected to split the radiant energy separately and individually into N+1 portions and a tree of 2×1 couplers to recombine the N+1 portions.

2. The optical telecommunication system of claim 1 wherein the 1×2 splitters and the 2×1 couplers separately and individually are single-mode integrated optic waveguides.

3. The optical telecommunication system of claim 1 further comprising a second transmission unit constructed in like manner as said first transmission unit, a transmission splitter connected to split radiant energy from said source into portions directed through separate paths to said first and second transmission units, a transmission coupler connected to combine radiant energy which has passed through said first and second transmission units and connected to said transmission path; and further comprising a second receiver unit constructed in like fashion as said first receiver unit and operably connected to said second end of said transmission path; and wherein said first and second receiver units respectively detect signals applied to said first and second transmitter units.

4. The optical telecommunication system of claim 3 where the lengths of the said path to the first and second transmission units may differ by 1000's of coherence lengths but may be more or less.

5. The optical telecommunication system of claim 1 wherein said means for dividing and recombining and said N+1 optical paths are part of N Mach-Zehnder configurations sharing a common reference path.

6. The optical telecommunication system of claim 1 wherein said means for dividing and recombining comprises a splitter connected to split the radiant energy separately and individually into the N+1 portions and a coupler to recombine the N+1 portions.

7. The optical telecommunication system of claim 1 wherein said means for dividing and recombining and said N+1 optical paths are part of N Michelson interferometers sharing a common reference path.

8. The optical telecommunication system of claim 1 wherein said N+1 optical paths separately and individually are optical fibers.

9. The optical telecommunication system of claim 1 wherein said N+1 optical paths separately and individually are single-mode integrated optic waveguides.

10. The optical telecommunication system of claim 9 wherein the optical path connecting the source to the transmitter is polarization maintaining optical fiber.

11. The optical telecommunication system of claim 9 further comprising an adjustment means for adjusting the state of polarization of the radiant energy from the transmission fiber parallel to the preferred direction of the receiver unit comprising a receiver integrated optical chip, in order to eliminate signal fading.

12. The optical telecommunication system of claim 1 wherein said source is a laser.

13. The optical telecommunication system of claim 1 wherein said source is a superluminescent diode.

14. The optical telecommunication system of claim 1 wherein said source is an edge emitting diode.

15. The optical telecommunication system of claim 1 wherein said source is a fiber optic laser.

16. The optical telecommunication system of claim 1 wherein two optical sources are provided for redundancy and including a means for selecting a specific one of said sources.

17. The optical telecommunications system of claim 16 wherein the means for selecting the specific optical source is a remotely controlled optical switch.

18. The optical telecommunication system of claim 1 wherein phase modulators are located on one path of each receiver pair.

19. The optical telecommunication system of claim 1 wherein an optical tap is provided at the output from the transmission unit for redundancy and diagnostic purposes.

20. The optical telecommunication system of claim 19 wherein said optical tap is a multiport fiber optic splitter.

21. The optical telecommunication system of claim 20 wherein said optical tap is a remotely controlled multiport optical switch.

22. The optical telecommunication system of claim 1 wherein an optical combiner is provided at the input of the receiver unit for redundancy and diagnostic purposes.

23. The optical telecommunication system of claim 22 wherein said optical tap is a multiport fiber optic splitter.

24. The optical telecommunication system of claim 22 wherein said optical tap is a remotely controlled multiport optical switch.

25. The optical telecommunication system of claim 1 wherein an optical isolator is provided immediately before each receiver unit in order to prevent back reflections for secure and full duplex operation.

26. An optical telecommunication system comprising:
a source of radiant energy,
a transmitter circuit coupled to said source for transforming the radiant energy into a multiplexed optical signal,
a transmission path coupled to said transmitter circuit for carrying said multiplexed optical signal, and
a receiver circuit coupled to said transmission path for transforming said multiplexed optical signal into a plurality of received signals, wherein
said transmitter circuit including:
a sequence of 1×2 splitters coupled to said source for dividing the radiant energy into a plurality of optical components, and
a sequence of 2×1 couplers connected to said optical paths for recombining said optical components into said multiplexed optical signal.

27. The system of claim 26, wherein said sequence of 1×2 splitters comprises a first 1×2 splitter coupled to said source for transforming the radiant energy into the optical components carried by input and first optical paths, and a second 1×2 splitter coupled to said input optical path for forming the optical components carried by second and third optical paths.

28. The system of claim 27, wherein said sequence of 2×1 couplers comprises a first 2×1 coupler connected to said second and third optical paths for forming the optical component carried by an output optical path, and a second 2×1 coupler connected to said output and first optical paths for forming the multiplexed optical signal.

29. The system of claim 28, wherein said first and second optical paths have first and second phase modulator for modulating the optical components by first and second telecommunication signals, respectively.

30. The system of claim 29, wherein the second optical path is longer than the third optical path by a first amount of path length difference.

31. The system of claim 30, wherein the first optical path is longer than the sum of the input, third and output optical paths by a second amount of path length difference.

32. The system of claim 31, wherein the second amount is greater than the first amount.

33. The system of claim 29, wherein said first and second optical paths further include first and second electrodes, respectively, for supplying the first and second bias voltages so as to apply the first and second telecommunication signals at the points of maximum linearity of the optical components in the first and second optical paths.

34. The system of claim 31, wherein said first and second optical paths are folded back to increase the first and second amount of path length difference.

35. The system of claim 31, wherein each of said first and second optical paths has several folds.

36. The system of claim 26 further comprising a polarization maintaining fiber coupled between said source and said transmitter circuit to propagate the radiant energy polarized in an optimum direction and to prevent propagation of the radiant energy polarized in the direction perpendicular to the optimum direction.

37. The system of claim 36, wherein said optimum direction is a preferred direction of an integrated optical chip carrying said transmitter circuit.

38. An optical telecommunication system comprising:
a source of radiant energy,
a transmitter circuit coupled to said source for transforming the radiant energy into a multiplexed optical signal,
a transmission path coupled to said transmitter circuit for carrying said multiplexed optical signal, and
a receiver circuit coupled to said transmission path for transforming said multiplexed optical signal into a plurality of received signals supplied to output ports, wherein
said receiver circuit including:
a polarization adjuster coupled to said transmission path for orienting a maximum polarization direction of the multiplexed optical signal with respect to a preferred direction of light propagation along a chip carrying said receiver circuit,
a splitter and a coupler coupled between said polarization adjuster and each of said output ports for dividing and recombining, respectively, the radiant energy received by the receiver circuit.

39. The system of claim 38, wherein said splitter and said coupler are connected via first and second optical paths carrying first and second optical components.

40. The system of claim 39, wherein said first optical path is longer than the second optical path by an amount of path length difference.

41. The system of claim 40, wherein said first optical path is provided with an electrode for supplying a bias voltage.

42. The system of claim 40, wherein said first optical path is folded back to increase the amount of path length difference.

43. The system of claim 42, wherein said first optical path comprises several folds.

44. The system of claim 38 further comprising a sensor for detecting a signal received at an output port of the receiver circuit, and an add/drop tributary card responsive to the sensor for supplying an information signal to a modulator of said transmitter circuit.

45. The system of claim 44, wherein said add/drop tributary card recovers clock and data to regenerate a telecommunication signal sent by said transmitter circuit.

46. The system of claim 44, wherein said sensor comprises a photodetector.

47. An optical telecommunication system comprising:
a source of radiant energy,
a transmitter circuit coupled to said source for transforming the radiant energy into a multiplexed optical signal,
a transmission path coupled to said transmission circuit for carrying said multiplexed optical signal, and
a receiver circuit coupled to said transmission path for transforming said multiplexed optical signal into a plurality of received signals supplied to output ports, wherein
said receiver circuit including:
a two by two optical fiber splitter for dividing the received optical signal from each output port into two equal first and second received signals,
a polarization adjuster for rotating the state of polarization of said first received signal by 90 degrees with respect to the state of polarization of said second received signal,
a first splitter and a first coupler coupled between said polarization adjuster and said output ports for dividing and recombining, respectively, said first received signal rotated by 90 degrees,
a second splitter and a second coupler coupled between said two by two optical fiber splitter and said output ports for dividing and recombining, respectively, said second received signal.

48. The system of claim 47, wherein said first splitter and said first coupler are connected via first and second optical paths carrying first and second optical components, and further wherein said second splitter and said second coupler are connected via third and fourth optical paths carrying third and fourth optical components.

49. The system of claim 48, wherein said first optical path is longer than said second optical path by a first amount of path length difference, and wherein said third optical path is longer than said fourth optical path by a second amount of path length difference.

50. The system of claim 49, wherein said first amount of path length difference and said second amount of path length difference are equal.

* * * * *